Feb. 1, 1938.  C. E. FREDERICKSON  2,106,946
DIFFERENTIAL MECHANISM
Filed March 31, 1936   3 Sheets-Sheet 1
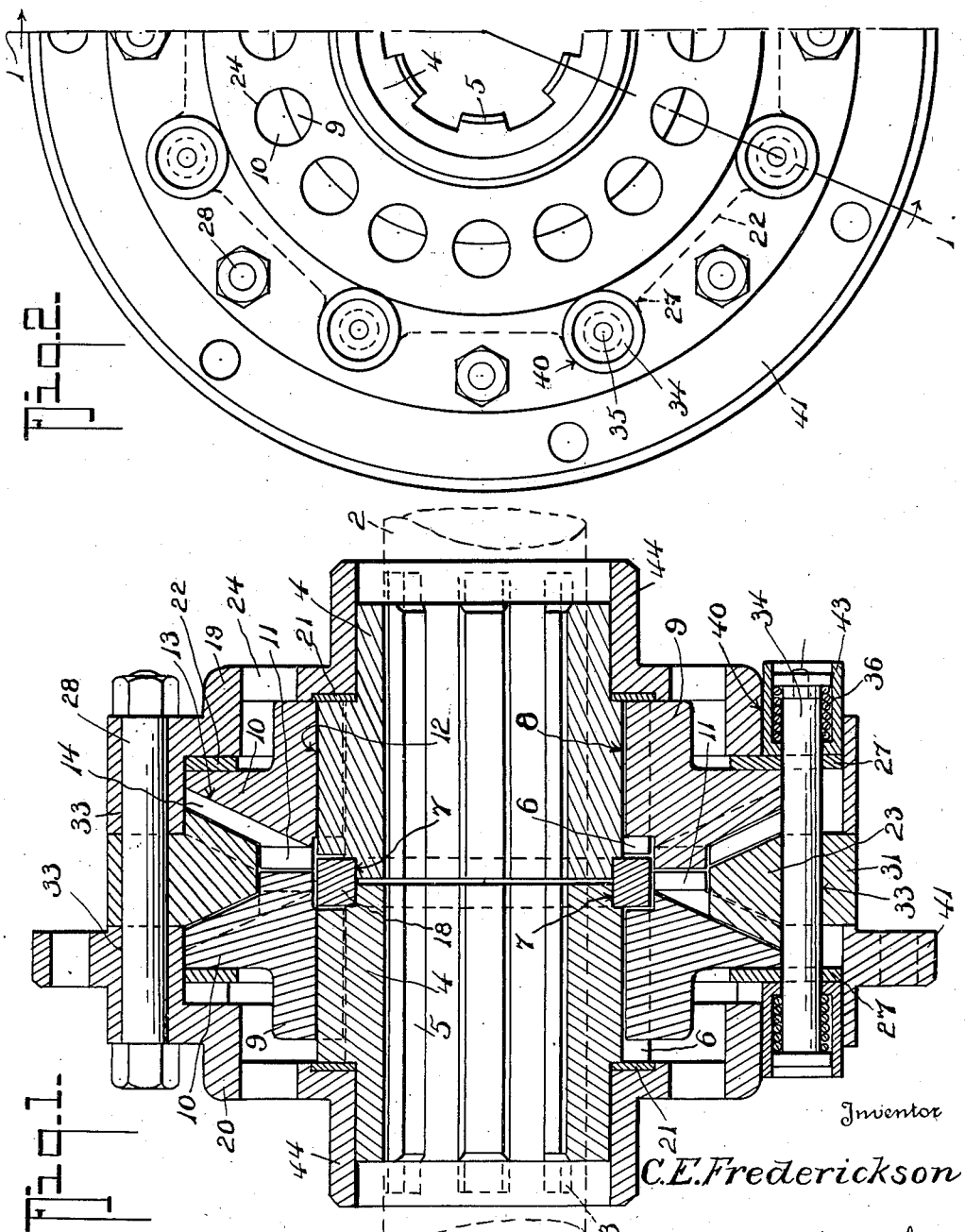
Inventor
C. E. Frederickson
By Albert E. Dieterich
Attorney Feb. 1, 1938.    C. E. FREDERICKSON    2,106,946
DIFFERENTIAL MECHANISM
Filed March 31, 1936    3 Sheets-Sheet 2
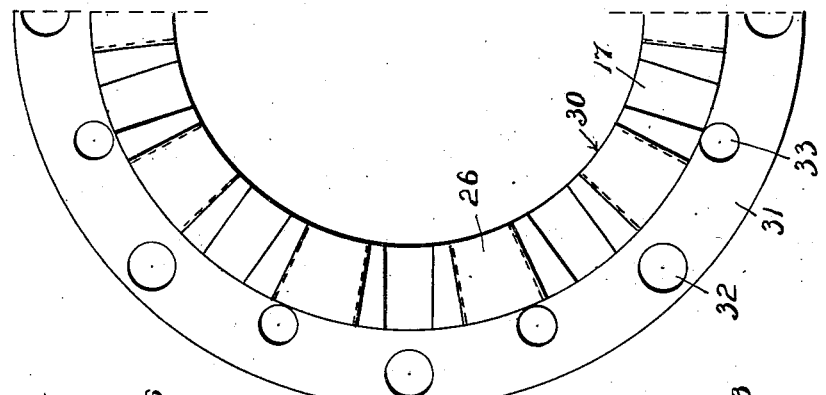
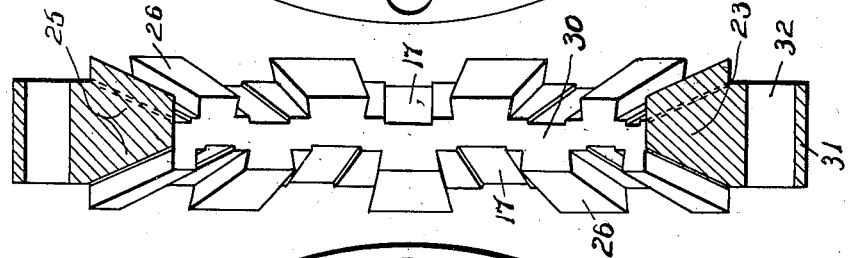
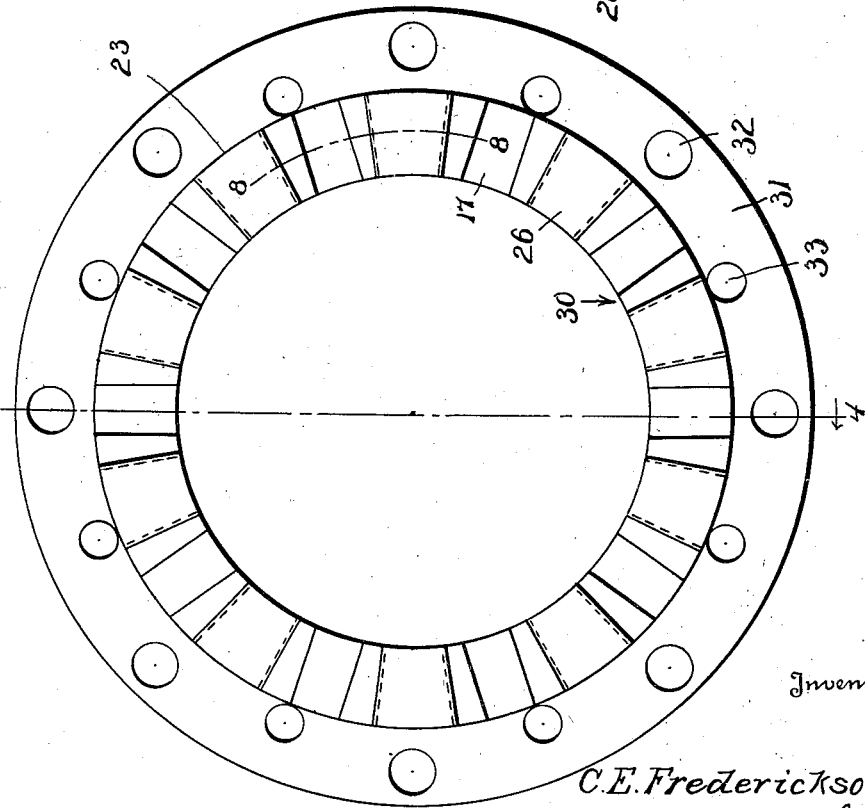
Inventor
C. E. Frederickson
By Albert E. Dieterich
Attorney

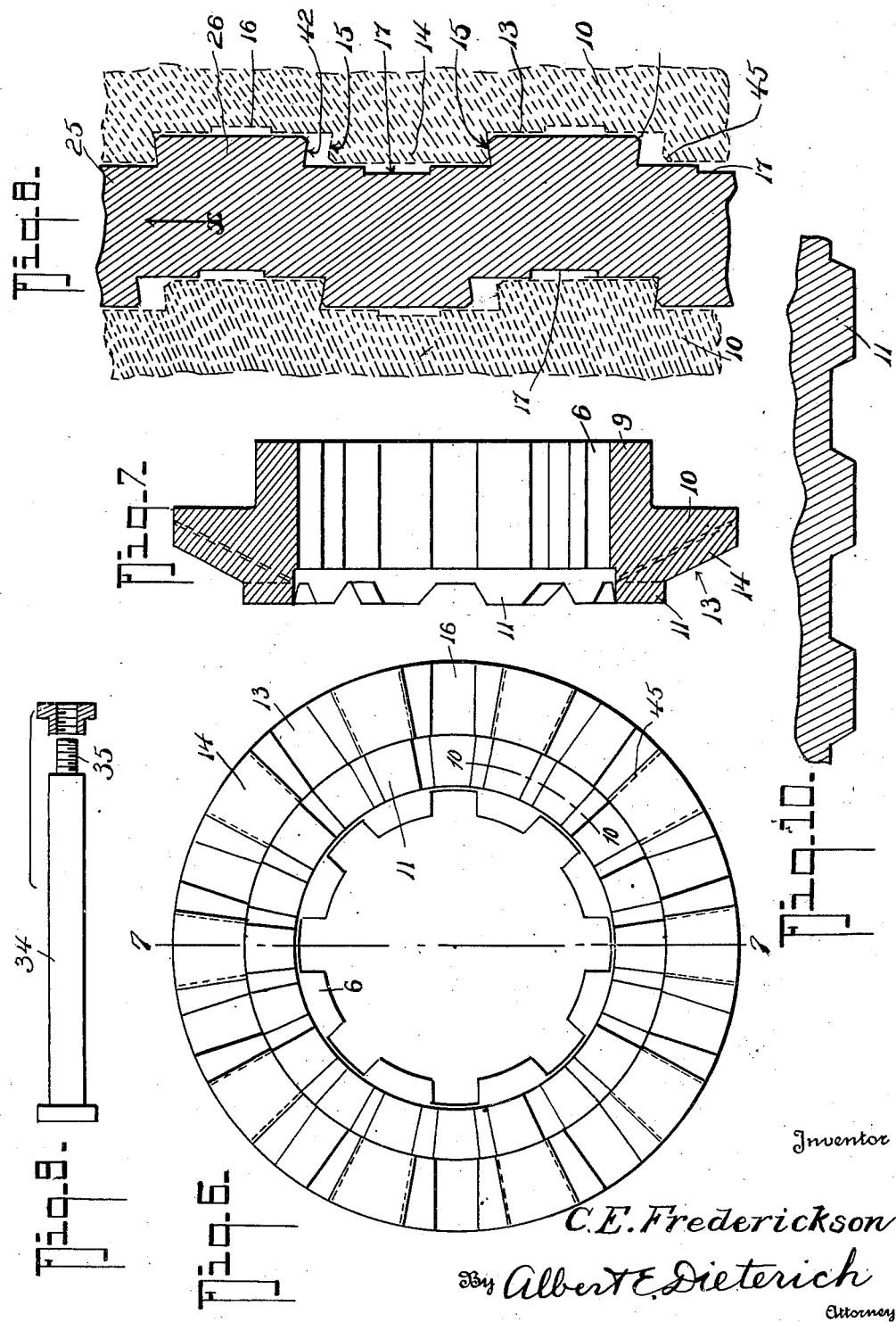

Patented Feb. 1, 1938

2,106,946

UNITED STATES PATENT OFFICE 2,106,946

DIFFERENTIAL MECHANISM

Clayton E. Frederickson, Chicago, Ill.

Application March 31, 1936, Serial No. 71,945

18 Claims. (Cl. 74—389.5)

My invention relates to the art of wheeled motor vehicles and particularly to that part of the vehicle known as the "differential". Differentials may generally be classed in two types: the geared and the gearless. The present invention relates to the gearless type, and it particularly has for its object to provide such a differential of as few parts as possible and one possessing a minimum amount of lost motion.

Further, the invention has for an object to provide a gearless differential which may be used on all types of cars and in other places where differentials are employed.

A further object of the invention is to simplify and improve the construction disclosed in my application filed February 21, 1935, Ser. No. 7,609, by making the driven clutch members of like construction (interchangeable), and by combining the functions of the springs with those of the cross keys or pins.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:—

Figure 1 is a vertical section of the invention, the section being taken on the line 1—1 of Figure 2.

Figure 2 is a side elevation of one-half of the structure shown in Figure 1.

Figure 3 is a side elevation of the driving clutch plate or member.

Figure 4 is a vertical section of the same on the line 4—4 of Figure 3.

Figure 5 is an elevation of one-half of the driving plate or member, taken from the side opposite that of Figure 3.

Figure 6 is a side elevation of one of the driven clutch plates or members.

Figure 7 is a section on the line 7—7 of Figure 6.

Figure 8 is an enlarged detail view illustrating how the teeth of the driving and driven clutch members engage.

Figure 9 is a detail elevational view of one of the cross pins with the parts thereof separated; and Figure 10 is an enlarged detail section on the line 10—10 of Figure 6.

In the drawings, in which like numerals of reference indicate like parts in all the figures, 1 and 2 represent the respective shafts or axles of an automobile rear axle assembly. These shafts are located in alignment and their adjacent ends are provided with spline grooves 3.

A spline collar 4, having internal splines 5, is fitted on each shaft. These collars have a tight fit on the shafts, although the shafts may be pulled out of the collars when it is desired to remove and replace the shafts. These collars are also provided with external splines 6 which engage with the spline grooves 12, hereinafter again referred to. The collars 4 have external bearing surfaces 7 to receive the center ring 18 which keeps the ends of the collars against frictional contact with one another. Each collar 4 has a bearing surface 8 for the hub of the adjacent driven clutch plate or member 10. The hubs 9 have the spline grooves 12, hereinbefore mentioned.

Each driven clutch member 10 has a set of cam teeth 11 and a set of clutch teeth 14 on its face 13, the clutch teeth being inclined to the vertical at an angle, preferably, of 25 degrees. The driving edges of the clutch teeth 14 are undercut as at 15 (see Figure 8), the purpose of which will later appear. The inner walls of the valleys between adjacent teeth are radially grooved as at 16, the purpose of which will also later appear. The two side clutch members 10—10 are of like construction, so the description of one of them will suffice for both.

The driving clutch plate or member 23 is illustrated in detail in Figures 3, 4 and 5, by reference to which it will be seen that it has a portion 25 having inclined clutch teeth 26 on both sides, the valleys between adjacent teeth being radially grooved as at 17. The driving clutch member is in the form of a ring, having an opening 30 to embrace the cam teeth 11—11 of the clutch members 10—10.

The member 23 has an apertured peripheral flange 31 which is provided with apertures 32 for passage of the bolts 28, later again referred to. The driving edges of the teeth 26 are undercut, as at 42.

The differential casing or cage member is composed of two similar sections 19 and 20, each of which has oil-circulating holes 24 and a hub 44, the latter serving as a bearing for the collar 4. Side thrust wear rings 21 are provided as shown. At the outer side of each driven clutch member 10 is a ring plate 22 having ears 27 apertured for the passage of the cross pins 34 which carry spring abutment cups 43 and springs 36 that serve continuously to urge the members 10—10 toward one another, and also serve, in combination with the pins 34 and cups 43, to limit the distance to which the members 10—10 may be separated.

The casing sections 19 and 20 have holes 40 for the cups 43 to pass through. At least one of the casing sections has a flange 41 to which the usual ring gear (not shown) may be secured in any suitable way, as by bolts or rivets. The casing sections also have holes 33 through which the bolts 28 pass.

The cross pins 34 are made in two parts for convenience in assembling, one part having an integral head and a reduced threaded end 35 to which the other head is screwed and secured by riveting over the end 35.

Operation

Assuming the vehicle to be running forward or backward in a straight line, the parts will be in the position indicated in Figure 8 with both clutch members 10 in full mesh with the clutch member 23. In this position assume the member 23 to be moving in the direction of the arrow x in Figure 8. The undercut portions 42 on the advance edges of the teeth 26 will engage the undercut portions 15 on the trailing edges of the teeth 14 and interlock therewith, as it were; the inclinations of the contacting parts serve to tend to draw together the three clutch members 23, 10 and 10.

When the vehicle turns, the outside wheel will be moving faster than the inside wheel and consequently the cam teeth 11 will unmesh, thereby forcing the cam plate of the outside wheel out of mesh with the driving plate 23, at which time the parts will be positioned as shown in Figure 1. When the machine again straightens out, the parts will mesh once more and driving power will be applied to both shaft sections 1 and 2.

The only lost motion encountered is that due to the depths of the undercut portions of the teeth 26 and 14 (see Figure 5), which is approximately equal to the pitch of cam teeth 11.

By providing the radial grooves 16 and 17 in the recesses or valleys between adjacent teeth, lubricant will pass therein and serve to prevent wear and will eliminate any tendency of the faces to stick together. Furthermore, the edge corners of the teeth 26 and 14 are preferably beveled, as at 45, to make engagement and disengagement easy and to prevent chipping of the teeth.

The teeth 26 on one side of the member 23 are staggered with respect to those on the other side.

From the foregoing it will be seen that my improved differential compensates for curves automatically. In the straight-away it transmits power equally and positively to both driving wheels of the vehicle and turns them at exactly equal speeds regardless of their traction. If both wheels lose their grip on the road, it is only necessary to provide traction for one wheel to be on one's way.

The invention has other advantages over the gear type of differentials, which advantages will be clear to those skilled in the art.

While I have illustrated a preferred embodiment of the invention, it is to be understood that changes in the construction and arrangement of parts may be made within the scope of the appended claims without departing from the spirit of the invention.

What I claim is:

1. A differential comprising a driving clutch member having clutch teeth on its opposite sides, two driven clutch members located one at each side of said driving clutch member and having clutch teeth to mesh respectively with those of said driving clutch member, two shaft sections, means to mount said driven clutch members on said shaft sections so that said driven clutch members will turn with and be slidable along said shaft sections, means to limit the movement apart of said driven clutch members to a distance such that only one driven clutch member at a time can be unmeshed from the driving clutch member, and including means continuously urging said driven clutch members into mesh with said driving clutch member.

2. A differential comprising a driving clutch member having an annular series of spaced clutch teeth on each of its two sides, two clutch members, one located at each side of said driving clutch member, each of said two clutch members having clutch teeth to cooperate with those of the driving clutch member, two shaft sections, means to mount said two clutch members on the respective shaft sections to turn therewith and be slidable along the same, means to limit the movement apart of said two clutch members to a distance such that only one of said two clutch members at a time can be unmeshed from the driving clutch member and for continuously urging said two clutch members into mesh with said driven clutch member.

3. A differential comprising a driving clutch member, aligned shaft sections, a casing to which a driving gear may be applied, means to mount said clutch member in said casing around the adjacent ends of said shaft sections, said driving clutch member having on both sides like annular series of spaced generally radially disposed clutch teeth, two independently driven clutch members located at opposite sides of said driving clutch member, one mounted on each shaft section to turn therewith and be slidable along the same, said two clutch members each having clutch teeth to cooperate with those of said driving clutch member, springs urging said driven clutch members into mesh with said driving clutch member, said teeth being adapted to unmesh and permit one driven clutch member to unmesh from said driving clutch member when unequal torque resistance is encountered by the shaft sections, and cross members extending through apertures in said driving clutch member and cooperative with said driven clutch members to permit but one driven clutch member to unmesh at a time from said driving clutch member.

4. A differential comprising a driving clutch member, aligned shaft sections, a casing to which a driving gear may be applied, means to mount said clutch member in said casing around the adjacent ends of said shaft sections, said driving clutch member having on both sides like annular series of spaced generally radially disposed clutch teeth, those on one face being staggered with respect to those on the other face, two independently driven clutch members located at opposite sides of said driving clutch member, one mounted on each shaft section to turn therewith and be slidable along the same, said two clutch members each having clutch teeth to cooperate with those of said driving clutch member, springs urging said driven clutch members into mesh with said driving clutch member, said teeth being adapted to unmesh and permit one driven clutch member to unmesh from said driving clutch member when unequal torque resistance is encountered by the shaft sections, and cross members extending through apertures in said driving clutch member and coperative with said driven clutch members to permit but one driven clutch member to unmesh at a time from said driving clutch member.

5. A differential comprising a driving clutch member, aligned shaft sections, a casing to which a driving gear may be applied, means to mount said clutch member in said casing around the adjacent ends of said shaft sections, said driving clutch member having on both sides like annular series of spaced generally radially disposed clutch teeth, two independently driven clutch members located at opposite sides of said driving clutch member, one mounted on each shaft section to turn therewith and be slidable along the same, said two clutch members each having clutch teeth to cooperate with those of said driving clutch member, springs urging said driven clutch members into mesh with said driving clutch member, said teeth being adapted to unmesh and permit one driven clutch member to unmesh from said driving clutch member when unequal torque resistance is encountered by the shaft sections, said driving clutch member having transverse apertures and cross pins passing through the same, ring plates at the outer sides of said driven clutch members, and having openings to pass said pins, spring cups on said pins and abutting said ring plates, said springs being located in said cups.

6. A differential comprising a driving clutch member, aligned shaft sections, a casing to which a driving gear may be applied, means to mount said clutch member in said casing around the adjacent ends of said shaft sections, said driving clutch member having on both sides like annular series of spaced generally radially disposed clutch teeth, those on one face being staggered with respect to those on the other face, two independently driven clutch members located at opposite sides of said driving clutch member, one mounted on each shaft section to turn therewith and be slidable along the same, said two clutch members each having clutch teeth to cooperate with those of said driving clutch member, springs urging said driven clutch members into mesh with said driving clutch member, said teeth being adapted to unmesh and permit one driven clutch member to unmesh from said driving clutch member when unequal torque resistance is encountered by the shaft sections, said driving clutch member having transverse apertures and cross pins passing through the same, ring plates at the outer sides of said driven clutch members, and having openings to pass said pins, spring cups on said pins and abutting said ring plates, said springs being located in said cups.

7. A differential comprising a driving clutch member, aligned shaft sections, a casing to which a driving gear may be applied, means to mount said clutch member in said casing around the adjacent ends of said shaft sections, said driving clutch member having on both sides like annular series of spaced generally radially disposed clutch teeth, two independently driven clutch members located at opposite sides of said driving clutch member, one mounted on each shaft section to turn therewith and be slidable along the same, said two clutch members each having clutch teeth to cooperate with those of said driving clutch member, springs urging said driven clutch members into mesh with said driving clutch member, said teeth being adapted to unmesh and permit one driven clutch member to unmesh from said driving clutch member when unequal torque resistance is encountered by the shaft sections, the spaces between adjacent clutch teeth of the several clutch members having their inner wall-faces radially grooved.

8. In a differential mechanism, a two-part casing having bearing hubs, two splined collars journaled in said hubs and each adapted to receive the end of an axle member, a driven clutch member slidably mounted on each collar and rotatable therewith, a driving clutch member mounted in said casing between said driven clutch members, said driving and said driven clutch members having engaging clutch teeth, said driven clutch members having engaging cam teeth, means continuously urging said clutch members together and limiting their separation apart to a predetermined distance, said means including a set of combined spring and cross pin units carried by the casing and operatively connected with said driven clutch members.

9. In a differential mechanism, a two-part casing having bearing hubs, two splined collars journaled in said hubs and each adapted to receive the end of an axle member, a driven clutch member slidably mounted on each collar and rotatable therewith, a driving clutch member mounted in said casing between said driven clutch members, said driving and said driven clutch members having engaging clutch teeth, said driven clutch members having engaging cam teeth, means continuously urging said clutch members together and limiting their separation apart to a predetermined distance, said means comprising ring plates engaging said driven clutch members, spring cups engaging said plates, cross pins passing through apertures in said casing and said driving clutch member and said cups, and springs in the cups on the pins for purposes described.

10. In a differential mechanism, a two-part casing having bearing hubs, two splined collars journaled in said hubs and each adapted to receive the end of an axle member, a driven clutch member slidably mounted on each collar and rotatable therewith, a driving clutch member mounted in said casing between said driven clutch members, said driving and said driven clutch members having engaging clutch teeth, said driven clutch members having engaging cam teeth, means continuously urging said clutch members together and limiting their separation apart to a predetermined distance, said means comprising ring plates engaging said driven clutch members, spring cups engaging said plates, cross pins passing through apertures in said casing and said driving clutch member and said cups, and springs in the cups on the pins for purposes described, said pins each comprising two sections secured together for purposes described.

11. In a differential mechanism, a two-part casing having bearing hubs, two splined collars journaled in said hubs and each adapted to receive the end of an axle member, a driven clutch member slidably mounted on each collar and rotatable therewith, a driving clutch member mounted in said casing between said driven clutch members, said driving and said driven clutch members having engaging clutch teeth, said driven clutch members having engaging cam teeth, means continuously urging said clutch members together and limiting their separation apart to a predetermined distance, said means comprising ring plates engaging said driven clutch members, spring cups engaging said plates, cross pins passing through apertures in said casing and said driving clutch member and said cups, and springs in the cups on the pins, said pins each comprising two sections permanently secured together after assembling.

12. In a differential mechanism, a two-part casing having bearing hubs, two splined collars journaled in said hubs and each adapted to receive the end of an axle member, a driven clutch member slidably mounted on each collar and rotatable therewith, a driving clutch member mounted in said casing between said driven clutch members, said driving and said driven clutch members having engaging clutch teeth, said driven clutch members having engaging cam teeth, means continuously urging said clutch members together and limiting their separation apart to a predetermined distance, said means including a set of combined spring and cross pin units carried by the casing and operatively connected with said driven clutch members, said collars having adjacent bearing surfaces, and a ring encircling said adjacent bearing surfaces.

13. A differential, including a driving clutch member having a series of clutch teeth on its opposite sides, two driven clutch members located one at each side of said driving clutch member and having clutch teeth to mesh respectively with those of said driving clutch member, two shaft sections, means to mount said driven clutch members on said shaft sections so that the driven clutch members will turn with and will be slidable along said shaft sections, means to limit the movement apart of said driven clutch members to a distance such that only one driven clutch member at a time can be unmeshed from the driving clutch member, and means continuously urging said driven clutch members into mesh with said driving clutch member.

14. A differential, including a driving clutch member having a series of clutch teeth on its opposite sides, two driven clutch members located one at each side of said driving clutch member and having clutch teeth to mesh respectively with those of said driving clutch member, two shaft sections, and means to mount said driven clutch members on said shaft sections so that the driven clutch members will turn with and will be slidable along said shaft sections, a single means functioning to limit the movement apart of said driven clutch members to a distance such that only one driven clutch member at a time can be unmeshed from the driving clutch member while said driven clutch members are continuously urged to mesh with said driving clutch member.

15. A differential comprising a driving clutch member having clutch teeth on its opposite sides, two driven clutch members located one at each side of said driving clutch member and having clutch teeth to mesh, respectively, with those of said driving clutch member, two shaft sections, means to mount said driven clutch members on said shaft sections so that said driven clutch members will turn with and be slidable along said shaft sections, means continuously urging said clutch members together and limiting their separation apart to a predetermined distance, said means including a set of combined spring and cross-pin units positioned through said driving clutch member and operatively connected with said driven clutch members.

16. A differential comprising a driving clutch member having clutch teeth on its opposite sides, two driven clutch members located one at each side of said driving clutch member and having clutch teeth to mesh, respectively, with those of said driving clutch member, two shaft sections, means to mount said driven clutch members on said shaft sections so that said driven clutch members will turn with and be slidable along said shaft sections, means continuously urging said clutch members together and limiting their separation apart to a predetermined distance, said means comprising ring plates engaging said driven clutch members, spring cups engaging said plates, cross-pins passing through apertures in said driving clutch member and said cups, and springs in the cups on the pins.

17. In a gearless differential, a driving clutch member and two driven clutch members located one at each side of the driving clutch member, means whereby the driven clutch members may be caused to unmesh from the driving clutch member, and means continuously urging said clutch members together and limiting their separation to such distance that only one driven clutch member at a time can unmesh from said driving clutch member, said means including a set of combined spring and cross-pin units positioned through openings in said driving clutch member and operatively connected with said driven clutch members.

18. In a gearless differential, a driving clutch member and two driven clutch members located one at each side of the driving clutch member, means whereby the driven clutch members may be caused to unmesh from the driving clutch member, and means continuously urging said clutch members together and limiting their separation to such distance that only one driven clutch member at a time can unmesh from said driving clutch member, said means comprising ring plates engaging said driven clutch members, spring cups engaging said plates, cross-pins passing through apertures in said driving clutch member and said cups, and springs in the cups on the pins.

CLAYTON E. FREDERICKSON.